Patented Oct. 1, 1935

2,015,876

UNITED STATES PATENT OFFICE 2,015,876

EXTRACTION AND CONCENTRATION OF VITAMINS

Barnett Sure, Fayetteville, Ark., and Elmer H. Stuart, Indianapolis, Ind.; said Stuart assignor to said Sure No Drawing. Application October 24, 1932,
Serial No. 639,296

8 Claims. (Cl. 167—81)

The present invention relates to an improved method of extracting and concentrating certain vitamines from materials containing them. It has particular reference to the extraction and concentration of vitamines B and G.

The present invention is an improvement in the method described and claimed in the co-pending application of Barnett Sure, Serial No. 437,272, filed March 19, 1930, in which application the principle of the method employed was to render efficient adsorption of the B vitamines on charcoal by previous removal of inert ingredients from the crude extract with glacial acetic acid and anhydrous acetone, which latter method is in turn an improvement over the method disclosed in Patent No. 1,869,721, issued August 2, 1932, to Barnett Sure. This method saved the laborious and expensive procedure formerly employed by other workers, which consisted of precipitating out impurities or inert substances with such metal salts as lead acetate and mercuric sulfate.

While the charcoal method following the use of glacial acetic acid and acetone worked satisfactorily when applied to large scale production, using as much as 1,000 pounds of rice polishings as raw material in one batch, it was found that considerable amounts of acetone are wasted which cannot be recovered, and that it is necessary to construct special expensive machinery for the recovery of the glacial acetic acid.

In order to render the process of extraction and concentration of vitamines entirely successful from the standpoint of economical production, it was necessary to eliminate the use of glacial acetic acid and anhydrous acetone for the purpose of removing the inert ingredients from the crude extract.

After considerable investigation and experimentation it was discovered that efficient adsorption of vitamines B and G can be obtained on adsorbent carbon when the alcoholic extract of the vitamine containing material is very dilute, without previous removal of the inert ingredients, provided a sufficient amount of purified carbon is used, and the hydrogen ion concentration is adjusted to meet the optimum conditions of the extract. It was also discovered that such a procedure results in a high yield of vitamines B and G and a great concentration.

The main object of this invention therefore resides in the novel and improved method for the extraction and concentration of vitamines B and G from materials containing them, which eliminates the necessity for the removal of the inert ingredients from the crude extract before the same is mixed with adsorbent carbon for the concentration of the said vitamines.

A further object of this invention resides in the novel and improved method of purifying vitamines B and G by subjecting a dilute alcoholic extract of the vitamin containing material to the selective adsorption of the vitamines by an active carbon at a hydrogen ion concentration favoring selective adsorptions.

We wish first to illustrate the invention by describing how the same may be practiced on rice polishings.

Generally our improved process involves extraction of the vitamine with a solvent from the base material, thus leaving a very dilute extract of the vitamine containing material. This extract will contain other materials besides the vitamine, such as bad tasting or smelling substances, which make the crude extract undesirable. The process then involves a purification by which undesirable impurities are eliminated and a useful extract or concentrate obtained.

As solvent for treating the base material we prefer to use an essentially water solvent, such as a dilute ethyl alcohol solution. We have found that a solvent which is 25% ethyl alcohol by volume and 75% water is suitable. It will, of course, be understood that other solvents may be used. The vitamines with which we are concerned are essentially water soluble and dissolve in the mixed alcohol and water as well as in water, provided a sufficient quantity is used. The alcohol aids in preventing a fermentation which might otherwise occur if acidified water were used for the extraction. In order to preserve vitamine B some acid is necessary in the extraction solvent and we have found that acid may be used in the extraction solvent without injuring the extraction of vitamine B. Slight acidity is all that is required and various acids may be used, such as acetic, hydrochloric, citric, etc. In the specific example to be described acetic acid is employed in the extraction solvent. This acid is ordinarily considered harmless in small amounts, being the acid of vinegar and having a recognized place in the diet.

As a specific example of the extraction of vitamins B and G from materials containing both of them, one may take ten pounds of rice polishings and 25 liters of alcohol which is 25% by volume and which contains 0.25% acetic acid. The rice polishings and the solvent are allowed to stand with intermittent agitation (about 8 hours a day) for about 48 hours at the temperature of the average living room. At the end of this period or such shorter period as may be chosen, the polishings are allowed to settle and the liquid is decanted from the settled matter. Undissolved vitamin and that which adheres to the settlings in the solvent remaining is then removed by a washing or extraction process with a further amount of an extracting solvent. The settlings may again be extracted with 14 liters of the same solvent, without any addition of acid, in 24 hours with intermittent agitation. The solvent is then decanted and the combined liquids are filtered from solid matter for recovery therefrom of a crude dilute extract. The volume of the combined extracts is 37 liters. The hydrogen ion concentration is now adjusted in a known manner to secure the measure of pH 5 to 6 and in the example specified herein this measure of hydrogen ion concentration may be obtained with 50% sodium hydroxide. For a pH of 5, which is preferable in smaller batches, 100 cc. of this strong alkali is needed. For a pH of 6, 160 cc. of the 50% alkali is required. Filter any insoluble material settling out. The extract is now ready for the addition of the adsorbent, which in this case may be commercial active carbon known as "Norite" and generally available on the market. Before adding this "Norite" charcoal, however, the same is purified in the following manner:

To one pound of charcoal add 2600 cc. distilled water and 325 cc. concentrated hydrochloric acid in a glass container and stir with a wooden stirrer for six hours at a temperature of 65 to 70 degrees C., and allow to stand over night. Filter and add 2500 cc. of 25% alcohol (by volume) and stir for four hours at a temperature of 55 to 60 degrees C., and allow to stand over night. Filter and transfer to percolators and wash with large volumes of distilled water by percolation until it is free from a test for chlorides. Then spread out in shallow pans until air dry.

The next step is that of the adsorption purification. To the 37 liters of alcoholic extracts add 250 grams of the purified charcoal, stir for two hours and allow to stand over night. Filter through a Buechner funnel, add 150 grams charcoal to the filtrate, stir for two hours and allow to stand over night. The first batch of charcoal on which the greater part of vitamins B and G have been adsorbed is labeled No. 1. The second batch of charcoal is labeled No. 2. The batches of charcoal recovered from the above separation are the containers of the vitamin.

We next provide a step for the elution of vitamins B and G from the charcoal. The charcoal labeled No. 1 is first treated by adding thereto 1200 cc. of tenth normal hydrochloric acid, warmed to a temperature of from 55 to 65 degrees C., stirred for one hour and allowed to stand over night. This solution is then filtered and again washed with 1200 cc. of tenth normal hydrochloric acid, warmed to a temperature of from 55 to 65 degrees C., stirred for one hour and allowed to stand over night. The solution is then again filtered and to the residue is added 1200 cc. of 25% alcohol (by volume) and 40 cc. concentrated hydrochloric acid, heated to a temperature of from 55 to 65 degrees C., stirred for one hour and allowed to stand over night.

The resultant solution is then again filtered and to the charcoal is added another 1200 cc. of 25% alcohol (by volume) and 25 cc. concentrated hydrochloric acid, heated to a temperature of from 55 to 65 degrees C., stirred for one hour and allowed to stand over night. This is then again filtered and all of the filtrates are then collected, said filtrates containing the vitamins B and G.

To the batch of charcoal labeled No. 2 is added 800 cc. of tenth normal hydrochloric acid, warmed to a temperature of from 55 to 65 degrees C., stirred for one hour and allowed to stand over night. This solution is then filtered and to the residue is again added 800 cc. of tenth normal hydrochloric acid, warmed to a temperature of from 55 to 65 degrees C., stirred for one hour and allowed to stand over night. The solution is then again filtered and to the charcoal is added 800 cc. of 25% alcohol (by volume) and 25 cc. concentrated hydrochloric acid, heated to a temperature of from 55 to 65 degrees C., stirred for one hour and allowed to stand over night. The solution is then again filtered and to the charcoal residue is added 800 cc. of 25% alcohol (by volume) and 15 cc. concentrated hydrochloric acid, heated to a temperature of from 55 to 65 degrees C., stirred for one hour and allowed to stand over night. This is then filtered and all of the filtrates obtained from the charcoal labeled No. 2 are then collected and combined with the filtrates obtained from the charcoal labeled No. 1. These filtrates now contain the vitamins B and G.

The filtrates may be concentrated by subjecting the same to a distillation process in vacuo as at 50 mm. to 75 mm. mercury pressure at a temperature not exceeding 70 degrees C., or the same may be concentrated by blowing a current of warm air, which is at a temperature not to exceed 70 degrees C., on the extracts spread out in shallow glass dishes. By repeated additions of distilled water the acidity can be reduced to a pH of 3 to 4. A yield of 14 to 17 grams of solids will result.

Each gram of solids contains 1000 Sherman vitamin B (B.1) units, and 330 of Sherman vitamin G (B.2) units, (the latter being calculated from biological tests obtained on the vitamin B complex),—the Sherman unit being defined as the gain of 3 grams per week per rat for a period of eight weeks. The ratio of vitamins B to G in the concentrate is, then, approximately 3 to 1.

Since cow's milk, according to the most recent findings, contains 0.1 unit of vitamin B and 0.3 unit of vitamin G per gram respectively, the vitamin concentrate is 10,000 times as potent in vitamin B and 1100 times as potent in vitamin G as cow's milk.

The ash content of the concentrate is 20% of the total solids.

Although we have illustrated our invention by describing our process specifically as we have carried it out to extract both vitamin B and G from rice polishings, it will be understood that the invention is capable of application to extract similar vitamins from other substances, such as wheat embryo, yeast and the like.

The extent of the adsorption of vitamins B and G on the charcoal is a maximum at some specific range of hydrogen ion concentration. The specific range is not fixed, and may vary with the kind or quality of adsorbent, and/or with the kind or quality of extract, depending on the quality or nature of the raw material used.

Attention is particularly directed to the fact that the principle made use of in this invention is that vitamins B and G are efficiently adsorbed on purified charcoal when the crude extract is very dilute, and when a sufficiency of charcoal is added to the dilute extract, after the hydrogen ion concentration of the extract has been adjusted to an optimum range, and when the elution of the vitamins from the charcoal is repeated several times with acidulated water and acidulated alcohol. Good results are also obtained when the elution of the vitamins from the charcoal is conducted only with acidulated alcohol.

As a preservative it is intended to use either one-tenth of 1% of sodium benzoate or 15% alcohol, since the concentrate will be most properly marketed as a solution.

It will be readily understood by those who are skilled in the art that a change in the raw material used as a source for the vitamin or vitmains may call for a change in the chemical reagents and the proportions and conditions of the operation. Also a change in the quantity of material treated in one operation and a change of equipment used from the small scale to large scale work will lead to economies in materials and in time, such as cannot be readily introduced nor here described for smaller batches. Character of the acid and the degree of acidity in the extraction are subject to variation.

The strength of the extracting solvent may be changed, as there is nothing to indicate that it is limited to exactly 25% of alcohol (by volume) with water. Also the hydrogen ion concentration may have to be changed when working with large scale production, also the proportion of acidulated water and acidulated alcohol, used in eluting the vitamins from the charcoal may have to be varied when proceeding from small to large batches. All those changes and modifications that fall within the scope of the appended claims are contemplated as falling within the scope of the invention as we hereby aim to disclose and claim the same.

1. The method of making a vitamin concentrate, which comprises subjecting a crude very dilute alcoholic extract containing vitamin B and impurities to the selective adsorption of the vitamin by a substantial quantity of active carbon as compared to the quantity of extract to be acted upon at a hydrogen ion concentration favoring selective adsorption, separating the carbon containing the vitamin from the liquid, adding more active carbon to the separated liquid, separating the second batch of carbon from the liquid, washing both said first and second batches of carbon first with acidulated water and then with acidulated alcohol, combining all of the washing liquids, and concentrating the liquid containing the vitamin.

2. The method of making a vitamin concentrate, which comprises forming a crude very dilute alcoholic extract containing vitamin B and impurities, adjusting the hydrogen ion concentration to permit selective adsorption of the vitamin by adsorbent carbon, adding a relatively large amount of adsorbent carbon as compared to the quantity of extract to be acted upon at said hydrogen ion concentration, separating the carbon containing the vitamin from the liquid, adding a second batch of carbon to the separated liquid and then separating the said second batch of carbon from the liquid, washing both said first and second batches of carbon with acidulated alcohol, combining the washing liquids, and concentrating the liquid containing the vitamin.

3. The method of making a vitamin concentrate, which comprises forming a crude very dilute alcoholic extract containing vitamin B and impurities, adjusting the hydrogen ion concentration to permit selective adsorption of the vitamin by adsorbent carbon, adding a relatively large amount of adsorbent carbon as compared to the quantity of extract to be acted upon at said hydrogen ion concentration, separating the carbon containing the vitamin from the liquid, adding a second batch of carbon to the separated liquid and then separating the said second batch of carbon from the liquid, washing both said first and second batches of carbon first with acidulated water and then with acidulated alcohol, combining all of the washing liquids and concentrating the liquid containing the vitamin.

4. The method of purifying a vitamin B, which comprises subjecting a very dilute alcoholic extract of the vitamin to the selective adsorption of a substantial quantity of active carbon as compared to the quantity of extract to be acted upon at a pH of between 5 and 6 which favor adsorption, separating the carbon containing the vitamin from the liquid, adding more carbon to the separated liquid, repeatedly washing both said first and second batches of carbon with a dilute hydrochloric acid solution, repeatedly washing both of said batches of carbon thereafter with a dilute alcohol solution, and mixing all of the washing liquids and removing the acid and the alcohol at a temperature which is not destructive of the vitamin to form a residual vitamin concentrate.

5. The method of concentrating vitamins B and G from rice polishings, which comprises subjecting the material to the solvent action of a mixture of substantially 25% by volume of alcohol with water and containing about 0.25% of acetic acid, separating solid and liquid, adjusting the hydrogen ion concentration to permit selective adsorption of said vitamin by adsorbent carbon, adding a relatively large amount of adsorbent carbon as compared to the quantity of extract to be acted upon at said hydrogen ion concentration, separating the carbon from the liquid, adding more adsorbent carbon to the separated liquid, separating the second batch of carbon from the liquid, repeatedly washing both said first and second batches of carbon first with acidulated water and then with acidulated alcohol until substantially all of the vitamin has been extracted, combining all of the washing liquids, and removing the acid and alcohol at a temperature which is not destructive of the vitamin to form a residual vitamin concentrate.

6. The method of making a vitamin concentrate, which consists in subjecting a crude dilute extract made up of about forty liters of dilute alcohol with about ten pounds of raw materials containing vitamins B and impurities to the selective adsorption of the vitamin by a substantial quantity of active carbon as compared to the quantity of extract to be acted upon at a hydrogen ion concentration favoring selective adsorption, separating the carbon containing the vitamin from the liquid, adding more active carbon to the separated liquid, separating the second batch of carbon from the liquid, washing both said first and second batches of carbon first with acidulated water and then with acidulated alcohol, combining all of the washing liquids and concentrating the liquid containing the vitamin.

7. The method of making a vitamin B concentrate, which comprises subjecting a crude dilute extract made up of about forty liters of dilute alcohol with about ten pounds of raw materials containing vitamins G and B and impurities to the selective adsorption of the vitamins by a substantial quantity of active carbon as compared to the quantity of extract to be acted upon at a hydrogen ion concentration favoring selective adsorption, separating the carbon containing the vitamins from the liquid, adding more carbon to the separated liquid, repeatedly washing both said first and second batches of carbon with a dilute hydrochloric acid solution, repeatedly washing both of said batches of carbon thereafter with a dilute alcohol solution, and mixing all of the washing liquids and removing the acid and the alcohol at a temperature which is not destructive of the vitamin to form a residual vitamin concentrate.

8. The method of making a vitamin concentrate, which comprises subjecting a crude dilute extract made up of about forty liters of dilute alcohol for every ten pounds of raw materials containing vitamins B and G and impurities to the selective adsorption of the vitamins by adding thereto about 250 grams of active carbon at a hydrogen ion concentration favoring selective adsorption, separating the carbon containing the vitamins from the liquid, adding about 150 grams more of active carbon to the separated liquid, separating the second batch of carbon from the liquid, washing both said first and second batches of carbon with acidulated water and then with acidulated alcohol, combining all of the washing liquids, and concentrating the liquids containing the vitamins.

BARNETT SURE.
ELMER H. STUART.